United States Patent
Van Baar et al.

(10) Patent No.: US 6,476,163 B2
(45) Date of Patent: *Nov. 5, 2002

(54) CATALYSTS FOR THE POLYMERIZATION OF OLEFINS AND PROCESS FOR THE PREPARATION THEREOF

(75) Inventors: Jan F. Van Baar, Uitgeest (NL); Maurizio Galimberti, Milan (IT); Klaas L. Von Hebel, Kortenhoef (NL); Andrew D. Horton, Amsterdam (NL); Gerard M. M. Van Kessel, Geldermalsen (NL); Peter A. Schut, Almere (NL); Tiziano Dall'occo, Ferrara (IT)

(73) Assignee: Basell Technology Company BV, Hoofddorp (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/331,928
(22) PCT Filed: Oct. 23, 1998
(86) PCT No.: PCT/EP98/06733
  § 371 (c)(1),
  (2), (4) Date: Jun. 29, 1999
(87) PCT Pub. No.: WO99/21896
  PCT Pub. Date: May 6, 1999

(65) Prior Publication Data
US 2002/0091062 A1 Jul. 11, 2002

(30) Foreign Application Priority Data
Oct. 29, 1997 (EP) .............................. 97203331

(51) Int. Cl.$^7$ .......................... C08F 4/642; C08F 4/655
(52) U.S. Cl. .......................... 526/127; 526/92; 526/153; 526/160; 526/943; 502/103; 502/111; 502/117; 502/132
(58) Field of Search .................. 502/111, 103, 502/117, 132; 526/153, 160, 943, 127, 92

(56) References Cited

FOREIGN PATENT DOCUMENTS

| EP | 368644 | * | 5/1990 |
| EP | 0 384 171 A1 | | 8/1990 |
| EP | 0 407 870 A2 | | 1/1991 |
| EP | 0 501 370 A1 | | 9/1992 |
| EP | 0 575 875 A2 | | 12/1993 |
| EP | 575875 | * | 12/1993 |
| WO | 96/02580 A1 | | 2/1996 |
| WO | WO96/02580 | * | 2/1996 |

OTHER PUBLICATIONS

Derwent Abstract of EP 407 870, 1/91.
Derwent Abstract of EP 501 370, 9/92.

* cited by examiner

Primary Examiner—David W. Wu
Assistant Examiner—R. Rabago
(74) Attorney, Agent, or Firm—Bryan Cave LLP

(57) ABSTRACT

Catalysts for the polymerization of olefins are disclosed, comprising the product obtainable by contacting: (A) a bridged and/or substituted cyclopentadienyl compound of Ti, Zr or Hf; (B) one or more organometallic aluminium compounds of formula (II): $AlR^4_{3-z}H_z$ wherein the substituents $R^4$, same or different from each other, are linear or branched, saturated or unsaturated $C_1$–$C_{20}$ alkyl or alkylaryl radicals, optionally containing Si or Ge atoms, wherein at least one of the substituents $R^4$ is different from a straight alkyl group; z is 0 or 1; and (C) water, the molar ratio between the organometallic aluminium compound and water being comprised between 1:1 and 100:1; said catalyst being obtainable by a process comprising the following steps: (i) contacting component (A) with part of component (B) in the absence of component (C); (ii) contacting part of component (B) with component (C) in the absence of component (A) and successively (iii) contacting the products obtained in steps (i) and (ii).

19 Claims, No Drawings

CATALYSTS FOR THE POLYMERIZATION OF OLEFINS AND PROCESS FOR THE PREPARATION THEREOF

The present invention relates to catalysts for the polymerisation of olefins. In particular, it relates to high activity catalysts for the polymerisation of olefins obtained from cyclopentadienyl compounds of a transition metal, organometallic aluminium compounds and water.

The invention also relates to processes for the polymerisation of olefins carried out in the presence of the catalysts of the invention.

Homogeneous catalytic systems based on metallocene compounds, aluminium alkyl compounds and water are known to be active in the polymerisation of olefins.

In European Patent Application EP 384,171, catalysts for the polymerisation of olefins are described which comprise the reaction product of:
(a) a metallocene compound of formula:

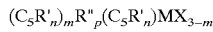

wherein $(C_5R'_n)$ is an optionally substituted cyclopentadienyl group and two or four R' substituents of one and the same cyclopentadienyl group can form one or two rings having 4 to 6 carbon atoms; R" is a divalent radical bridging the two cyclopentadienyl groups; X can be for instance an halogen atom; M is a transition metal selected from Ti, Zr and Hf; p is 0 or 1; m is 0, 1 or 2, and when m=0 then p=0, and when p=0 at least one R' substituent is different from hydrogen; n=4 when p=1, and n=5 when p=0; and
(b) an alumoxane of the formula:

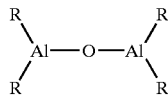

wherein the substituents R can generically be alkyl, alkenyl or alkylaryl radicals, having 2–20 carbon atoms.

The alumoxanes (b) are prepared by reacting the corresponding trialkylaluminium compounds with water in a molar ratio of 2:1. In the alumoxanes used in the embodiment examples, the R substituents are isobutyl or 2-methylpentyl groups.

European Patent Application EP 575,875 describes homogeneous catalytic systems for the polymerisation of olefins comprising:

(A) a cyclopentadienyl compound of formula:

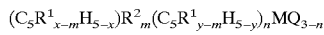

in which M is Ti, Zr or Hf; $C_5R^1_{x-m}H_{5-x}$ and $C_5R^1_{y-m}H_{5-y}$ are equally or differently substituted cyclopentadienyl rings and two or four substituents $R^1$ of the same cyclopentadienyl group can form one or two rings, having from 4 to 6 carbon atoms; $R^2$ is a bridging group which links the two cyclopentadienyl rings; the substituents Q are preferably chlorine atoms; m can be 0 or 1; n can be 0 or 1, being 1 when m=1; x is an integer comprised between m+1 and 5; y is an integer comprised between m and 5;
(B) an organometallic aluminium compound of formula:

wherein the substituents $R^4$ are alkyl, alkenyl or alkylaryl radicals, containing from 1 to 10 carbon atoms, which may also contain Si or Ge atoms, at least one of the substituents $R^4$ being different from a straight alkyl group; z is 0 or 1; and
(C) water.

The molar ratio between the organometallic aluminium compound and the water is comprised between 1:1 and 100:1. In the embodiment examples, only triisobutylaluminium and triisohexylaluminium are used as the organometallic aluminium compounds.

International Patent Application WO 96/02580 describes improved catalytic systems comprising:

(A) a cyclopentadienyl compound of formula:

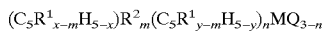

in which M is Ti, Zr or Hf; $C_5R^1_{x-m}H_{5-x}$ and $C_5R^1_{y-m}H_{5-y}$ are equally or differently substituted cyclopentadienyl rings; the substituents $R^1$, the same or different from each other, are alkyl, alkenyl, aryl, alkylaryl or arylalkyl radicals, which have 1 to 20 carbon atoms, optionally containing Si or Ge atoms or groups $Si(CH_3)_3$, or two or four substituents $R^1$ of one and the same cyclopentadienyl group can also form one or two rings, having 4 to 6 carbon atoms; $R^2$ is a bridging group linking the two cyclopentadienyl rings and is selected from $CR^3_2$, $C_2R^3_4$, $SiR^3_2$, $Si_2R^3_4$, $GeR^3_2$, $Ge_2R^3_4$, $R^3_2SiCR^3_2$, $NR^1$ and $PR^1$, wherein the substituents $R^3$, the same or different from each other, are $R^1$ or hydrogen, or two or four substituents $R^3$ can also form one or two rings, having 3 to 6 carbon atoms; the substituents Q, the same or different from each other, are halogen, hydrogen, $R^1$, $OR^1$, $SR^1$, $NR^1_2$ or $PR^1_2$; m can be 0 or 1; n can be 0 or 1, being 1, if m=1; x is an integer comprised between (m+1) and 5; and y is an integer comprised between m and 5;
(B) an organometallic aluminium compound of formula:

wherein in the $(CH_2\text{—}CR^4R^5R^6)$ groups, the same or different from each other, $R^4$ is an alkyl, alkenyl or arylalkyl group, having from 1 to 10 carbon atoms; $R^5$ is an alkyl, alkenyl, aryl, arylalkyl or alkylaryl group, having from 3 to 50 carbon atoms which is different from a straight alkyl or alkenyl group and, optionally, $R^4$ and $R^5$ fused together can form a ring, having from 4 to 6 carbon atoms; $R^6$ is hydrogen or an alkyl, alkenyl or arylalkyl group, having from 1 to 10 carbon atoms; the $R^7$ substituents, the same or different from each other, are alkyl, alkenyl, aryl, arylalkyl or alkylarl radicals. containing from 1 to 10 carbon atoms, optionally containing Si or Ge atoms; w is 1, 2 or 3; z is 0 or 1; y=3−w−z; and
(C) water.

The molar ratio between the organometallic aluminium compound and water is comprised between 1:1 and 100:1. The only organometallic aluminium compounds disclosed are those wherein the $(CH_2\text{—}CR^4R^5R^6)$ groups are 2,4,4-trimethyl-pentyl, 2-phenyl-propyl or 1-butene oligomers. According to the cited application, the compound (B) can be contacted with (A) and successively with (C), or can be reacted with (C) and successively with (A); moreover, in the examples, the three components are mixed together at the same time.

It has now surprisingly been found that, by contacting components (A), (B) and (C) described in the abovementioned European patent application EP 575,875 according to a novel procedure, catalysts can be obtained with higher activity than those obtained according to the prior art.

It is therefore an object of the present invention a catalyst for the polymerisation of olefins, comprising the product obtainable by contacting the following components:

(A) a cyclopentadienyl compound of formula (I):

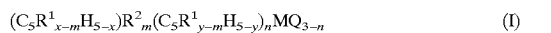

$$(C_5R^1_{x-m}H_{5-x})R^2_m(C_5R^1_{y-m}H_{5-y})_nMQ_{3-n} \quad (I)$$

wherein M is a metal selected from the group consisting of Ti, Zr and Hf; $C_5R^1_{x-m}H_{5-x}$ and $C_5R^1_{y-m}H_{5-y}$ are equally or differently substituted cycopentadienyl rings; the substituents $R^1$, the same or different from each other, are selected from the group consisting of a linear or branched, saturated or unsaturated $C_1$–$C_{20}$ alkyl, $C_6$–$C_{20}$ aryl, $C_7$–$C_{20}$ alkylaryl or $C_7$–$C_{20}$ arylalkyl groups radicals, optionally containing one or more atoms belonging to groups 13–16 of the Periodic Table of the Elements (new IUPAC notation), such as B, P, Al, Si, Ge, O and S atoms, or two or four substituents $R^1$ of the same cyclopentadienyl group form one or two rings, having 4 to 6 carbon atoms; $R^2$ is a bridging group between the two cyclopentadienyl rings and is selected from the group consisting of $CR^3_2$, $C_2R^3_4$, $SiR^3_2$, $Si_2R^3_4$, $GeR^3_2$, $Ge_2R^3_4$, $R^3_2SiCR^3_2$, $NR^1$ and $PR^1$, wherein the substituents $R^3$, the same or different from each other, are hydrogen or have the same meaning of $R^1$, or two or four substituents $R^3$ form one or two rings, having 3 to 6 carbon atoms, the substituents Q, the same or different from each other, are selected from the group consisting of hydrogen, halogen, OH, SH, $R^1$, $OR^1$, $SR^1$, $NR^1_2$ and $PR^1_2$; m is 0 or 1; n is 0 or 1, being 1 when m=1; x ranges from (m+1) to 5, and preferably between (m+2) and 5; and y ranges from m to 5;

(B) one or more organometallic aluminium compounds of formula (II):

$$AlR^4_{3-z}H_z \quad (II)$$

wherein the substituents $R^4$, the same or different from each other, are linear or branched, saturated or unsaturated $C_1$–$C_{20}$ alkyl or $C_7$–$C_{20}$ alkylaryl radicals, optionally containing Si or Ge atoms, at least one of the substituents $R^4$ being different from a straight alkyl group; z is 0 or 1; and (C) water;

the molar ratio between said organometallic aluminium compound (B) and water (C) is comprised between 1:1 and 100:1, preferably between 1:1 and 50:1, and more preferably is 2:1; said catalyst being obtainable by a process comprising the following steps:
  (i) contacting component (A) with part of component (B), in the absence of component (C);
  (ii) contacting part of component (B) with component (C), in the absence of component (A); and successively
  (iii) contacting the products obtained in steps (i) and (ii);

wherein the components (B) used in steps (i) and (ii) can be the same or different from each other.

In the cyclopentadienyl compounds of formula (I), M is preferably zirconium. When m=0 in formula (I), $C_5R^1_{x-m}H_{5-x}$ and $C_5R^1_{y-m}H_{5-y}$ are preferably pentamethylcyclopentadienyl, indenyl or 4,5,6,7-tetrahydroindenyl groups; the Q substituents are preferably chlorine atoms or $C_1$–$C_7$ hydrocarbon groups, and more preferably are methyl groups.

Non-limiting examples of cyclopentadienyl compounds of formula (I), wherein m=0, are:

| | | |
|---|---|---|
| (MeCp)$_2$MCl$_2$ | (Me2Cp)$_2$MCl$_2$ | (MeCp)$_2$MMe$_2$ |
| (Me$_3$Cp)$_2$MCl$_2$ | (Me$_4$Cp)$_2$MCl$_2$ | (Me$_5$Cp)$_2$MCl$_2$ |
| (Me$_5$Cp)$_2$MMe$_2$ | (Me$_5$Cp)$_2$M(OMe)$_2$ | (Me$_5$Cp)$_2$M(C$_6$H$_5$)$_2$ |
| (Me$_5$Cp)$_2$M(CH$_3$)Cl | (EtMe$_4$Cp)$_2$MCl$_2$ | [(C$_6$H$_5$)Me$_4$Cp]$_2$MCl$_2$ |
| (Et$_5$Cp)$_2$MCl$_2$ | (Me$_5$Cp)$_2$M(C$_6$H$_5$)Cl | (Ind)$_2$MCl$_2$ |
| (Ind)$_2$MMe$_2$ | (H$_4$Ind)$_2$MCl$_2$ | (H$_4$Ind)$_2$MMe$_2$ |
| [(Si(CH$_3$)$_3$Cp]$_2$MCl$_2$ | {[Si(CH$_3$)$_3$]$_2$Cp}$_2$MCl$_2$ | (Me$_4$Cp)(Me$_5$Cp)MCl$_2$ |
| (Me$_5$Cp)MCl$_3$ | (Me$_5$Cp)MBenz$_3$ | (Ind)MBenz$_3$ |
| (H$_4$Ind)MBenz$_3$ | | | wherein Me=methyl, Et=ethyl, Cp=cyclopentadienyl, Ind=indenyl, H$_4$Ind=4,5,6,7-tetrahydroindenyl and Benz=benzyl.

When m=1 in formula (I), $C_5R^1_{x-m}H_{5-x}$ and $C_5R^1_{y-m}H_{5-y}$ are preferably tetramethyl-cyclopentadienyl, indenyl, 4,5,6, 7-tetrahydroindenyl, 2-methyl-4,5,6,7-tetrahydroindenyl, 4,7-dimethyl-4,5,6,7-tetrahydroindenyl, 2,4,7-trimethyl-4,5, 6,7-tetrahydroindenyl or fluorenyl groups; $R^2$ preferably (CH$_3$)$_2$Si< or —CH$_2$CH$_2$—; the Q substituents are preferably chlorine atoms or $C_1$–$C_7$ hydrocarbon groups, and more preferably methyl groups.

Non-limiting examples of cyclopentadienyl compounds of formula (I), wherein m=1, are:

| | | |
|---|---|---|
| Me$_2$Si(Me$_4$Cp)$_2$MCl$_2$ | Me$_2$Si(Me$_4$Cp)$_2$MMe$_2$ | Me$_2$C(Me$_4$Cp)(MeCp)MCl$_2$ |
| Me$_2$Si(Ind)$_2$MCl$_2$ | Me$_2$Si(Ind)$_2$MMe$_2$ | Me$_2$Si(Me$_4$Cp)$_2$MCl(OEt) |
| C$_2$H$_4$(Ind)$_2$MCl$_2$ | C$_2$H$_4$(Ind)$_2$MMe$_2$ | C$_2$H$_4$(Ind)$_2$M(NMe$_2$)$_2$ |
| C$_2$H$_4$(H$_4$Ind)$_2$MCl$_2$ | C$_2$H$_4$(H$_4$Ind)$_2$MMe$_2$ | C$_2$H$_4$(H$_4$Ind)$_2$M(NMe$_2$)OMe |
| Ph(Me)Si(Ind)$_2$MCl$_2$ | Ph$_2$Si(Ind)$_2$MCl$_2$ | Me$_2$C(Flu)(Cp)MCl$_2$ |
| C$_2$H$_4$(Me$_4$Cp)$_2$MCl$_2$ | C$_2$Me$_4$(Ind)$_2$MCl$_2$ | Me$_2$SiCH$_2$(Ind)$_2$MCl$_2$ |
| C$_2$H$_4$(2-MeInd)$_2$MCl$_2$ | C$_2$H$_4$(3-MeInd)$_2$MCl$_2$ | C$_2$H$_4$(4,7-Me$_2$Ind)$_2$MCl$_2$ |
| C$_2$H$_4$(5,6-Me$_2$Ind)$_2$MCl$_2$ | C$_2$H$_4$(2-MeH$_4$Ind)$_2$MCl$_2$ | |
| C$_2$H$_4$(2,4,7-Me$_3$H$_4$Ind)$_2$MCl$_2$ | C$_2$H$_4$(4,7-Me$_2$H$_4$Ind)$_2$MCl$_2$ | |
| C$_2$H$_4$(2,4,7-Me$_3$Ind)$_2$MCl$_2$ | | |
| C$_2$H$_4$(2-Me-Benz[e]Ind)$_2$MCl$_2$ | C$_2$H$_4$(Benz[e]Ind)$_2$MCl$_2$ | |
| Me$_2$Si(2-MeInd)$_2$MCl$_2$ | Me$_2$Si(4,7-Me$_2$Ind)$_2$MCl$_2$ | |
| Me$_2$Si(5,6-Me$_2$Ind)$_2$MCl$_2$ | Me$_2$Si(2,4,7-Me$_3$Ind)$_2$MCl$_2$ | |
| Me$_2$Si(2-MeH$_4$Ind)$_2$MCl$_2$ | Me$_2$Si(4,7-Me$_2$H$_4$Ind)$_2$MCl$_2$ | |
| Me$_2$Si(2,4,7-Me$_3$H$_4$Ind)$_2$MCl$_2$ | Me$_2$Si(Benz[e]Ind)$_2$MCl$_2$ | |
| Me$_2$Si(2-Me-Benz[e]Ind)$_2$MCl$_2$ | Me$_2$Si(2-Me-4-Ph-Ind)$_2$MCl$_2$ | |
| Me$_2$Si(2-Me-4-naphtyl-Ind)$_2$MCl$_2$ | Me$_2$C(2-MeInd)$_2$MCl$_2$ | |
| Me$_2$C(2-Me-4-Ph-Ind)$_2$MCl$_2$ | Me$_2$C(3-tButInd)$_2$MCl$_2$ | |

| | |
|---|---|
| H₂C(3-tButInd)₂MCl₂ | Me₂C(3-iPrInd)₂MCl₂ |
| H₂C(3-iPrInd)₂MCl₂ | Me₂Si(3-tButInd)₂MCl₂ | wherein Me=methyl, Cp=cyclopentadienyl, Ind=indenyl, Flu=fluorenyl, Ph=phenyl and H₄Ind=4,5,6,7-tetrahydroindenyl.

In component (B) of the catalyst of the invention, according to a preferred embodiment, said organometallic aluminium compounds have formula (III):

$$Al(CH_2-CR^4R^5R^6)_wR^7_yH_z \qquad (III)$$

wherein in the (CH₂—CR⁴R⁵R⁶) groups, the same or different from each other, $R^4$ is a linear or branched, saturated or unsaturated $C_1-C_{10}$ alkyl or $C_7-C_{10}$ arylalkyl group; $R^5$ is a saturated or unsaturated $C_3-C_{50}$ alkyl, $C_6-C_{50}$ aryl, $C_7-C_{50}$ arylalkyl or alkylaryl group, which is different from a straight alkyl or alkenyl group; or $R^4$ and $R^5$ form a ring, having from 4 to 6 carbon atoms; $R^6$ is hydrogen or a linear or branched, saturated or unsaturated $C_1-C_{10}$ alkyl, $C_7-C_{10}$ arylalkyl group; the $R^7$ substituents, the same or different from each other, are linear or branched, saturated or unsaturated $C_1-C_{10}$ alkyl, $C_6-C_{10}$ aryl, $C_7-C_{10}$ arylalkyl or alkylaryl groups, optionally containing Si or Ge atoms; w is 1, 2 or 3; z is 0 or 1; and y=3−w−z.

A particularly preferred compound corresponding to formula (III) is tris(2,4,4-trimethyl-pentyl)aluminium (TIOA).

According to another preferred embodiment of the catalyst of the invention, said organometallic aluminium compounds, to be used as component (B), correspond to formula (IV):

$$Al(CH_2-CR^4R^5-CR^6R^7R^8)_wR^9_qH_z \qquad (IV)$$

wherein $R^4$ is a linear or branched, saturated or unsaturated $C_1-C_{10}$ alkyl or $C_7-C_{10}$ arylalkyl group; $R^5$ is hydrogen or a linear or branched, saturated or unsaturated $C_1-C_{10}$ alkyl or $C_7-C_{10}$ arylalkyl group; $R^6$ and $R^7$, the same or different from each other, are linear or branched, saturated or unsaturated $C_1-C_{10}$ alkyl, $C_6-C_{10}$ aryl, $C_7-C_{10}$ arylalkyl or alkylaryl groups; $R^8$ is hydrogen or a linear or branched, saturated or unsaturated $C_1-C_{10}$ alkyl, $C_6-C_{10}$ aryl, $C_7-C_{10}$ arylalkyl or alkylaryl group; $R^9$ is a linear or branched, saturated or unsaturated $C_1-C_{10}$ alkyl or $C_7-C_{10}$ arylalkyl group; a carbon atom in the compound of formula (IV) being optionally replaced by a Si or Ge atom; w is 1, 2 or 3; z is 0 or 1; and q=3−w−z.

Particularly preferred compounds corresponding to formula (IV) are tris(2,3,3-trimethyl-butyl)aluminium (TTMBA) and tris(2,3-dimethyl-butyl)aluminium (TDMBA).

The molar ratio between said organometallic aluminium compound (component B) and said cyclopentadienyl compound (component C) is preferably comprised between 50 and 50,000, and more preferably between 500 and 5,000.

According to the invention, both in step (i) and (ii), component (B) can suitably comprise a mixture of two or more organometallic aluminum compounds of formula (II), and preferably of compounds of formula (III) and/or (IV).

Moreover, both in steps (i) and (ii), component (B) can be used in combination with organometallic aluminum compounds other than those of formulae (II), (III) and (IV), or in mixture with other compatible cocatalysts known in the state of the art. In the organometallic aluminium compounds of formulae (II), (III) or (IV), z is 0 or 1. As it is known in the state of the art, aluminium trialkyls may contain small amounts of dialkyl-aluminium hydride; the hydride content can slightly change during prolonged storage periods and depending on the storage temperature. Therefore, according to a preferred embodiment of the invention, component (B) is a mixture of the two organometallic aluminium compounds of formula (II), (III) and/or (IV) wherein z=0 and z=1, so that the molar ratio between the hydrogen atoms directly bound to aluminium and aluminium atoms (i.e. the overall z value) is lower than 0.8, and even more preferably ranges from 0.02 to 0.3. Mixtures of organometallic aluminium compounds having said overall z values can be prepared with methods known in the state of the art, for instance by mixing the corresponding trialkylaluminium and dialkylaluminium hydride in appropriate molar ratios.

Another object of the present invention is a process for the preparation of a catalyst as described above, said process comprising the following steps:

(i) contacting component (A) with part of component (B) in the absence of component (C);

(ii) contacting part of component (B) with component (C) in the absence of component (A); and successively (iii) contacting the products obtained in steps (i) and (ii); wherein the components (B) used in steps (i) and (ii) can be the same or different from each other.

In step (i), component (A) is preferably contacted with component (B) in a suitable solvent, such as toluene; the concentration of component (A) in said solution is preferably comprised between $10^{-2}$ and $10^{-8}$ mol/l. The amount of component (B) used in step (i) preferably ranges from 1 to 80% mol of the total amount of (B) used in the process of the invention, and more preferably from 2 to 10% mol. The precontact can be carried out in the presence of small amounts of monomer. The contact time is generally comprised between 1 and 60 minutes, preferably between 5 and 20 minutes.

In step (ii) of the process of the invention, according to a particular embodiment of the invention, water can be gradually added to component (B) in solution, in an aliphatic or aromatic inert hydrocarbon solvent, such as heptane or toluene. In said solution, the concentration of the product obtainable by contacting said organometallic aluminium compound and water is preferably comprised between 10 and $10^{-3}$ mol/l. The amount of component (B) used in step (ii) preferably ranges from 20 to 99% mol of the total amount of (B) used in the process of the invention, and more preferably from 90 to 98% mol.

According to another embodiment, the water can be introduced in the monomer or in one of the monomers to be polymerised, and contacted with said organometallic aluminium compound. According to still another embodiment, the water can be reacted in a combined form, as a hydrated salt, or it can be adsorbed or absorbed on an inert support such as silica. The contact time is generally comprised between 1 and 60 minutes, preferably between 5 and 20 minutes.

The catalysts of the present invention can be used on inert supports, such as silica, alumina, styrene/divinylbenzene copolymers, homopolymers and copolymers of ethylene and α-olefins; the thus obtained solid systems can be suitably used in gas phase polymerizations.

The catalysts of the present invention can be used in the polymerisation reactions of olefins. Therefore, according to further object, the invention provides a process for the polymerisation of an olefin carried out in the presence of a catalyst as described above.

Olefins which can be polymerised with the process of the present invention are, for instance, α-olefins of formula $CH_2=CHR$, wherein R is hydrogen or a $C_1–C_{20}$ alkyl radical.

The catalysts according to the present invention can conveniently be used in ethylene homopolymerization, in particular for the preparation of HDPE, and in ethylene copolymerization, in particular for the preparation of LLDPE. In ethylene polymerisation, according to a preferred embodiment of the invention, component (B) is a mixture of the two organometallic aluminium compounds of formula (II) wherein z=0 and z=1, in such amounts that the molar ratio between the hydrogen atoms directly bound to aluminium and aluminium atoms (i.e. the overall z value) preferably ranges from 0.02 to 0.3. More specifically, in step (i), said overall z value is preferably higher than 0.02, and more preferably is about 0.09; in step (ii), said overall z value is preferably lower than 0.2.

The process according to the present invention allow to prepare LLDPE copolymers having a content of ethylene units of between 80 and 99 mol %; said copolymers have a density comprised between 0.87 and 0.95 $g/cm^3$ and are characterised by a uniform distribution of the α-olefin units along the polymeric chain.

Comonomers which can be suitably used in ethylene copolymers comprise α-olefins of formula $CH_2=CHR$, wherein R is a linear, branched or cyclic $C_1–C_{20}$ alkyl, and cycloolefins. Examples of such olefins are propylene, 1-butene, 1-pentene, 4-methyl-1-pentene, 1-hexene, 1-octene, allylcyclohexane, cyclopentene, cyclohexene, norbornene and 4,6-dimethyl-1-heptene. The units deriving from the olefins of formula $CH_2=CHR$ or from cycloolefins are generally present in the copolymers in a quantity ranging from 1 to 20 mol %.

The copolymers can also contain units deriving from polyenes, in particular from conjugated or non-conjugated, linear or cyclic dienes, such as 1,4-hexadiene, isoprene, 1,3-butadiene, 1,5-hexadiene and 1,6-heptadiene.

According to another object of the invention, the above catalysts can be used in propylene homopolymerization, in particular for the production of isotactic polypropylene.

In propylene polymerisation, according to a preferred embodiment of the invention, component (B) is a mixture of the two organometallic aluminium compounds of formula (II) wherein z=0 and z=1, in such amounts that the molar ratio between the hydrogen atoms directly bound to aluminium and aluminium atoms (i.e. the overall z value) preferably ranges from 0.02 to 0.3. More specifically, in step (i), said overall z value is preferably higher than 0.02, and more preferably is about 0.09; in step (ii), said overall z value is preferably lower than 0.4.

According to a further embodiment, the catalysts of the invention can be advantageously used in the preparation of elastomeric copolymers of ethylene with α-olefins of formula $CH_2=CHR$, wherein R is a $C_1–C_{10}$ alkyl radical, optionally containing minor proportions of polyenes units. The saturated elastomeric copolymers obtainable with the catalysts of the present invention contain from 15 to 85 mol % of ethylene units, the complement to 100% consisting of units of one or more α-olefins and/or of a non-conjugated diolefin able to cyclopolymerize. The unsaturated elastomeric copolymers also contain, in addition to the units deriving from the polymerisation of ethylene and α-olefins, minor proportions of unsaturated units deriving from the copolymerization of one or more polyenes. The content of unsaturated units can vary from 0.1 to 5% by moles and it is preferably comprised between 0.2 and 2% by moles.

The elastomeric copolymers obtainable with the catalysts of the invention are endowed with valuable properties, such as a low content of ashes and uniformity of distribution of the comonomers along the copolymeric chain.

The α-olefins which can be used as comonomers in the elastomeric copolymers comprise propylene, 1-butene, 4-methyl-1-pentene, 1-hexene and 1-octene.

Polyenes which can be used in elastomeric copolymers comprise:

polyenes able to give unsaturated units, such as:
linear, non-conjugated dienes such as 1,4-hexadiene trans, 1,4-hexadiene cis, 6-methyl-1,5-heptadiene, 3,7-dimethyl-1,6-octadiene, 11-methyl-1,10-dodecadiene;
monocyclic diolefins such as, for example, cis-1,5-cyclooctadiene and 5-methyl-1,5-cyclooctadiene;
bicyclic diolefins such as for example 4,5,8,9-tetrahydroindene and 6 and/or 7-methyl-4,5,8,9-tetrahydroindene;
alkenyl or alkyliden norbornenes such as for example, 5-ethyliden-2-norbornene, 5-isopropyliden-2-norbornene, exo-5-isopropenyl-2-norbornene, 5-vinyl-2-norbornene;
polycyclic diolefins such as, for example, dicyclopentadiene, tricyclo-$[6.2.1.0^{2.7}]$4,9-undecadiene and the 4-methyl derivative thereof;

non-conjugated diolefins able to cyclopolymerize, such as 1,5-hexadiene, 1,6-heptadiene, 2-methyl-1,5-hexadiene;
conjugated dienes, such as butadiene, 1,3-pentadiene and isoprene.

A furter interesting use of the catalysts according to the present invention is in the preparation of cycloolefin polymers. Monocyclic and polycyclic olefin monomers can be either homopolymerized or copolymerized, also with linear olefin monomers. Non limitative examples of cycloolefin polymers which can be prepared with the catalysts of the present invention are described in the European patent applications EP-501,370 and EP-407,870.

The polymerisation processes of the present invention can be carried out in liquid phase, optionally in the presence of inert hydrocarbon solvents, or in gas phase. Said hydrocarbon solvent can be either aromatic (such as toluene) or aliphatic (such as propane, hexane, heptane, isobutane, cyclohexane and 2,2,4-trimethylpentane).

The polymerisation temperature generally ranges from about 0° C. to about 250° C. In particular, in the processes for the preparation of HDPE and LLDPE, it is preferably comprised between 20° C. and 150° C. and, more preferably between 40° C. and 90° C., whereas for the preparation of elastomeric copolymers it is preferably comprised between 0° C. and 200° C. and, more preferably between 20° C. and 100° C.

The molecular weight of polymers can be varied simply by varying the polymerisation temperature, the type or the concentration of the catalyst components, or by using molecular weight regulators, such as hydrogen.

The molecular weight distribution can be varied by using mixtures of different cyclopentadienyl compounds or by carrying out the polymerisation in several stages which differ in the polymerisation temperature and/or the concentrations of molecular weight regulator. The polymerisation yield depends on the purity of the metallocene components in the catalyst. Therefore the metallocene obtained by the process of the invention may be used as such, or subjected to purification treatments.

The following examples are given for illustrative purposes and do not restrict the invention.

EXAMPLES

Synthesis of the Catalytic Components
Cyclopentadienyl Compounds rac-Et(1-H$_4$Ind)$_2$ZrCl$_2$ (r-EBTHIZrCl$_2$)

The product available from Witco was used.

rac-Et(1-Ind)$_2$ZrCl$_2$ (r-EBIZrCl$_2$)

This was prepared according to the procedure described in EP 575,875.

Organoaluminium Compounds
General Procedures

All reactions were carried out under nitrogen in the glove box or under Schlenk conditions using oven-dried glassware. The toluene solvent was dried by refluxing over Na/benzophenone and the xylene solvent (Aldrich anhydrous grade) was dried over 4 Å molecular sieves. All alkenes were dried over 4 Å molecular sieves prior to use.
tris(2,3,3-trimethyl-butyl)aluminium (TTMBA)

In the glove box, CH$_2$=C(Me)(CMe$_3$)(81.5 g, 0.831 mol; "99%" ex-Wiley) was dissolved in dry p-xylene (ca. 145 ml) in a 500 ml 3-neck flask. Al{CH$_2$CHMe$_2$}$_3$ (TIBA, 35.0 ml, 0.139 mol, ex-Witco) was added over 10 min by syringe to the rapidly stirred solution at ambient temperature. The stoppered reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 35 minutes to an internal temperature of 105.6° C. The reaction was allowed to reflux for 20 h (final reflux temperature 121.2° C.), affording ca. 95% of the theoretical maximum yield of isobutene (ca. 2.9 equivalents/Al). Despite the low boiling point of CH$_2$=C(Me)(CMe$_3$), only a negligible amount of this olefin was collected in the cold trap. The remaining olefin and solvent were removed in vacuo (80° C., 0.05 mbar, 90 min) utilising a dry ice/acetone bath to give 43.0 g (95.5% yield based on TIBA) of tris(2,3,3-trimethyl-butyl) aluminium (TTMBA). The colourless oil was shown by NMR spectroscopy to be a clean single species, showing no sign of AlH or AlOR resonances.
tris(2,3-dimethyl-butyl)aluminium (TDMBA)

TDMBA was prepared analogously to TTMBA from the reaction of CH$_2$=CHMeCHMe$_2$ (42.6 g, 0.507 mol, 99% ex-Wiley) with TIBA (21.4 ml, 0.085 mol, ex-Witco) in dry xylene (90 ml; isomer mixture) in a 500 ml 3-neck flask. The mixture was allowed to reflux for 20 h (range reflux temperature: 85–109° C.), affording 30 ml of volatile material in the dry ice trap consisting of ca. 8 ml of CH$_2$=CHMeCHMe$_2$ and ca. 22 ml of isobutene (ca. 100% of theoretical). The remaining olefin and solvent were removed in vacuo (60° C., 0.7 mbar, 90 min) utilizing a dry ice/acetone trap to give 23.4 g (97% yield based on TIBA) of tris(2,3-dimethyl-butyl)aluminium (TDMBA).The colourless oil was shown by $^1$H and $^{13}$C NMR spectroscopy to be clean TDMBA contaminated by 4% (molar basis) of Al(CH$_2$CHMe$_2$)(CH,CHMeCH$_2$Me$_2$)$_2$; no NMR resonances due to AlH or AlOR fragments were observed.
tris(2,4,4-trimethyl-pentyl)aluminium (TIOA)

This was prepared according to the method described in Liebigs Ann. Chem., Volume 629, Ziegler et al. "Aluminiumtrialkyle und Dialkyl-aluminiumhydride aus Aluminiumisobutyl-Verbindungen [Aluminium trialkyls and dialkyl-aluminium hydrides from aluminium isobutyl compounds]", pages 14–19.
tris(2-methyl-propyl)aluminium (TIBA)

The product available from Witco was used.
Triisooctylaluminoxane (TIOAO)

3.45 ml of a TIOA solution (1 M in hexane) were added at room temperature to 5 ml of toluene, previously deoxygenated and distilled over triisobutylaluminum. 0.031 ml of H$_2$O were then added at room temperature with a syringe and the resulting solution was stirred for 10 minutes at room temperature.

Example 1

Ethylene/propylene Copolymerization

The ethylene/propylene copolymerization was performed in a 4.26 l steel autoclave equipped with mechanical stirrer, external jacket for thenmostatting the polymerisation bath, valves for the introduction of liquids and gases. A mixture of vapour/water was allowed to flow inside the external jacket and their relative amount was controlled to set the polymerisation temperature. 1317 grams of hexane, 1.688 mmol of TIOAO, 0.1879 mmol of TIOA, 396.8 grams of propylene, 37.4 grams of ethylene, 15 ml of hydrogen were charged into the autoclave. The internal temperature of the autoclave was brought to 50° C. and it was waited until a constant pressure, 8.8 barg, was achieved. In this way, the thermodynamic equilibrium in the polymerisation bath was considered to be achieved. At this time, in a 25 ml schlenk, 0.8 mg of racemic ethylene bis-tetrahydroindenyl zirconium dichloride was dissolved in 5 ml of a TIOA solution in hexane, containing 0.188 mmol of TIOA. The solution was allowed to stir for 10 minutes and was then injected into the autoclave by using a slight overpressure (0.5 bar) of ethylene.

During the polymerisation test, ethylene was fed to keep constant the polymerisation ation pressure. The polymerisation was quenched after 17 minutes, when 40 g of ethylene had been fed, by injecting CO.

The polymer was recovered by precipitation in acetone and filtration and was dried under reduced pressure at 60° C. for 3 hours. 86 grams was obtained. The ethylene content was 60.6% by weight and the intrinsic viscosity 3.34 dl/g.

Example 2 (Comparative)

Ethylene/propylene Copolymerization

The polymerisation test was performed as in example 1, except that:

(i) 16.9 mg of H$_2$O were fed to the autoclave before the monomers.

(ii) No aluminium compounds, either TIOA or TIOAO, were charged into the autoclave.

(iii) 0.8 mg of rac-EBTHIZrCl$_2$ were dissolved in 5 ml of a TIOA solution in hexane, containing 1.88 mmol of TIOA.

(iv) The polymerisation was stopped when 40 g of ethylene had been fed, in this case after 23 minutes.

(v) 80 grams of polymer were recovered.

The ethylene content was 59% by weight and the intrinsic viscosity 3.16 dl/g.

Example 3

Ethylene/propylene Copolymerization

The ethylene/propylene copolymerization was performed in a 250 ml glass flask equipped with a magnetic stirrer, a thermocouple, valves for the introduction of liquids and gases and a tube to bubble the mixture of gaseous monomers into the polymerisation solution.

100 ml of toluene containing 3.45 mmol of TIOAO were fed into the glass autoclave and an ethylene/propylene mixture, with 60% by weight of ethylene, was allowed to bubble into the solution and to flow through it at a flow rate of 1.5 l/min. The temperature of the toluene solution was brought to 50° C. by using an oil bath. The total pressure, under these conditions, was 80 mmHg.

At this time, in a 10 ml schlenk, 1.47 mg of rac-EBTHIZrCl$_2$ were dissolved in 5 ml of toluene containing 34.5 μmol of TIOA. The solution was allowed to stir for 1 minute and was then injected into the glass autoclave. The polymerisation was stopped after 15 minutes by injecting 2 ml of methanol. The polymer was precipitated with a large amount of methanol, filtered and dried under reduced pressure at 50° C. for 8 hours. 3.9 grams of polymer were weighed. The ethylene content was 65% by weight.

Example 4 (Comparative)
Ethylene/propylene Copolymerization

The copolymerization was performed as in example 3 except that the metallocene was dissolved in toluene in the absence of any aluminium compound. 3.2 grams of polymer were obtained.

Examples 5–10
Polymerisation of Propylene

A 5 litre reactor equipped with helical stirrer, steam/water temperature control and a catalyst injection system was heated to 150–160° C. overnight, whilst purging with nitrogen, cooled and then pickled at 70° C. using a mixture of TIBA (0.25 g), toluene (20 ml) and propylene (500 g). The pickle mixture was removed and the reactor then charged with 1650 g liquid propylene, whilst increasing the temperature from 20° C. to 50° C.

Separately, 9.00 mmol of TIOA was dissolved in 20 g of toluene in a bottle with a septum cap. The solution was cooled to 0–4° C. using an ice bath, and 81 μl of water (4.5 mmol) added in four shots using a 25 μl syringe, whilst maintaining the temperature below 15° C. and purging the solution with nitrogen. The resulting solution was introduced into the reactor using an injection system, washed in using 20 ml of toluene.

Meanwhile, 9.7 mg of rac-Et(1-Ind)$_2$ZrCl$_2$ (r-EBIZrCl$_2$; 23.2 μmol) was dissolved in 17.6 g of toluene, and an amount of the solution obtained containing 3.0 μmol of metallocene was reacted with the indicated amount of the compound indicated in table 2 as "prealkylating agent", resulting in a colour change from yellow to light yellow. Ten minutes after the introduction of the hydrolysed alkylalurninium mixture into the reactor, the alkylated zirconocene solution (aged for 5 minutes) was injected into the reactor (using 20 ml toluene). The polymerisation was continued for 1 hour at a constant temperature of 50° C. using 840–1100 rpm stirring. The polymerisation was then stopped by injection of 5–10 ml methanol. The heating was then discontinued and the propylene rapidly vented and the powder polypropylene collected. Fouled material was removed using hot toluene and precipitated with methanol. The polypropylene fractions were dried (70–80° C., 200 mbar, nitrogen purge) and combined to give the total yield of polypropylene.

The data relating to the activity of the catalytic system are indicated in Table 2.

Example 11 (Comparative)
Polymerisation of Propylene

The pickle procedure described in Examples 5 to 10 was followed and the reactor then allowed to cool to 25° C. 81 μl of water (4.5 mmol) was then introduced into the autoclave (utilising a septum attachment connected to the propylene feed tube) using a syringe. The reactor was than charged with 1650 g of propylene, rapidly heated to 50° C., and the system then allowed to reach equilibrium over 60 min.

Separately 3.28 g of TIOA (9.0 mmol) was added to a solution of r-EBIZrCl$_2$ (3.0 μmol) in toluene (6.0 g) and the solution stirred for 20 min at 25° C. The alkylated zirconocene solution was then injected into the reactor (using 20 ml toluene). The polymerisation and polymer work-up were performed as described in Examples 5 to 10. The polymerisation conditions and the data relating to the obtained polymer are indicated in Table 2.

Example 12 (Comparative)
Polymerisation of Propylene

The general procedure described in Examples 5 to 10 was followed except that metallocene prealkylation was not performed: the solution of the metallocene in (alkylaluminium-free) toluene (1.31 g) was directly injected into the reactor (using an additional 20 ml of toluene). The amounts of metallocene, aluminium compound and water utilised, and the polymerisation conditions, as well as the data relating to the obtained polymer are indicated in Table 2.

Example 13
Polymerization of Propylene

The general procedure described in Examples 5–10 was followed but using Al{CH$_2$CHMeCHMe$_2$}$_3$ (TDMBA) as organometallic aluminium compound according to the present invention, instead of TIOA and operating with the amounts of metallocene, aluminium compound and water indicated in Table 2. The polymerization conditions and the data relating to the obtained polymer are indicated in Table 2.

Example 14 (Comparative)
Polymerisation of Propylene

The procedure of Example 13 was followed, with the exception that the metallocene prealkylation was not performed: the solution of the metallocene in (alkylaluminium-free) toluene was directly injected into the reactor. The amounts of metallocene, aluminium compound and water utilised, and the polymerisation conditions, as well as the data relating to the obtained polymer are indicated in Table 2.

Example 15
Polymerization of Propylene

The general procedure described in Examples 5–10 was followed but using Al{CH$_2$CH(Me)CMe$_3$}$_3$ (TTMBA) as organometallic aluminium compound according to the present invention, instead of TIOA and operating with the amounts of metallocene, aluminium compound and water indicated in Table 2. The polymerization conditions and the data relating to the obtained polymer are indicated in Table 2.

Example 16 (Comparative)
Polymerisation of Propylene

The procedure of Example 15 was followed, with the exception that the metallocene prealkylation was not performed: the solution of the metallocene in (alkylaluminium-free) toluene was directly injected into the reactor. The amounts of metallocene, aluminium compound and water utilised, and the polymerisation conditions, as well as the data relating to the obtained polymer are indicated in Table 2.

Example 17
Polymerization of Propylene

The general procedure described in Examples 5–10 was followed but using TTMBA as organometallic aluminium compound in the metallocene prealkylation (step (i)) and a mixture of TIOA/TTMBA, at a molar ratio of 29:1, in step (ii), wherein TTMBA is Al{CH$_2$CH(Me)CMe$_3$}$_3$; the amounts of metallocene, aluminium compound and water used in the procedure are indicated in Table 2, as well as the polymerization conditions and the data relating to the obtained polymer.

sisting of linear or branched, saturated or unsaturated C$_1$–C$_{20}$ alkyl, C$_6$–C$_{20}$ aryl, C$_7$–C$_2$alkylaryl or C$_7$–C$_{20}$ arylalkyl radicals, optionally containing one or more atoms belonging to groups 13–16 of the Periodic Table of the Elements (new IUPAC notation); or two or four substituents R$^1$ of the same cyclopentadienyl group form one or two rings, having 4 to 6 carbon atoms; R$^2$ is a bridging group between the two cyclopentadienyl rings and is selected from the group consisting of CR$^3{}_2$, C$_2$R$^3{}_4$, SiR$^3{}_2$, Si$_2$R$^3{}_4$, GeR$^3{}_2$, Ge$_2$R$^3{}_4$, R$^3{}_2$SiCR$^3{}_2$, NR$^1$ and PR$^1$, wherein the substituents R$^3$, the same or different from each other, are hydrogen or have the same meaning as R$^1$, or two or four substituents R$^3$ form one or two rings, having 3 to 6 carbon atoms; the substituents Q, the same or different from each

TABLE 1

Ethylene/propylene copolymerisation

| Example | Metallocene Type | μmol | Prealkylating agent Type | Mmol | Reactor Compound | mmol | Total Al/Zr mol | Time min | Yield g pol | Activity kg/gZr*30 min |
|---|---|---|---|---|---|---|---|---|---|---|
| 1 | r-EBTHIZrCl$_2$ | 1.88 | TIOA | 0.188 | TIOA/TIOAO | 0.1879/1.688 | 1100 | 17 | 86 | 830 |
| 2 (comp) | r-EBTHIZrCl$_2$ | 1.88 | TIOA | 1.88 | H$_2$O | 0.94 | 1000 | 23 | 80 | 610 |
| 3 | r-EBTHIZrCl$_2$ | 3.45 | TIOA | 0.0345 | TIOAO | 3.45 | 1010 | 15 | 3.88 | 25 |
| 4 (comp) | r-EBTHIZrCl$_2$ | 3.45 | | | TIOAO | 3.45 | 1000 | 15 | 3.25 | 21 |

TABLE 2

Propylene polymerisation

| Example | Metallocene Type | μmol | Prealkylating agent Type | mmol | Cocatalyst Type | mmol | Al/H$_2$O mol | Total Al/Zr mol | Yield g pol. | Activity kg/gZr.h |
|---|---|---|---|---|---|---|---|---|---|---|
| 5 | r-EBIZrCl$_2$ | 3.0 | TIOA | 0.30 | TIOA | 9.00 | 2 | 3100 | 470 | 1720 |
| 6 | r-EBIZrCl$_2$ | 3.0 | TTMBA | 0.30 | TIOA | 9.00 | 2 | 3100 | 585 | 2140 |
| 7 | r-EBIZrCl$_2$ | 3.0 | TIBA | 0.30 | TIOA | 9.00 | 2 | 3100 | 374 | 1370 |
| 8 | r-EBIZrCl$_2$ | 3.0 | TIOA | 0.03 | TIOA | 9.00 | 2 | 3010 | 253 | 920 |
| 9 | r-EBIZrCl$_2$ | 3.0 | TIOA | 0.15 | TIOA | 9.00 | 2 | 3050 | 510 | 1860 |
| 10 | r-EBIZrCl$_2$ | 3.0 | TIOA | 1.50 | TIOA | 9.00 | 2 | 3500 | 421 | 1540 |
| 11 (Comp)* | r-EBIZrCl$_2$ | 3.0 | TIOA | 9.00 | — | — | 2 | 3000 | 44 | 160 |
| 12 (Comp) | r-EBIZrCl$_2$ | 3.0 | — | — | TIOA | 9.00 | 2 | 3000 | 113 | 410 |
| 13 | r-EBIZrCl$_2$ | 2.0 | TDMBA | 0.30 | TDMBA | 9.00 | 2 | 4690 | 525 | 2880 |
| 14 (Comp) | r-EBIZrCl$_2$ | 2.0 | — | — | TDMBA | 9.00 | 2 | 4500 | 0 | 0 |
| 15** | r-EBIZrMe$_2$ | 3.0 | TTMBA | 0.34 | TTMBA | 10.1 | 2.3 | 3500 | 850 | 3650 |
| 16 (Comp) | r-EBIZrMe$_2$ | 3.0 | — | — | TTMBA | 10.1 | 2.3 | 3380 | 480 | 1750 |
| 17 | r-EBIZrCl$_2$ | 3.0 | TTMBA | 0.35 | TIOA/TTMBA | 9.10 | 2 | 3130 | 640 | 2340 |

*Mixture of TIOA/r-EBIZrCl$_2$ added to water in autoclave.
**Polymerization time of 51 minutes.

What is claimed is:

1. A catalyst for the polymerization of olefins comprising the product obtained by contacting the following components:

(A) a cyclopentadienyl compound of formula (I):

$$(C_5R^1{}_{x-m}H_{5-x})R^2{}_m(C_5R^1{}_{y-m}H_{5-y})_nMQ_{3-n} \quad (I)$$

wherein M is a metal selected from the group consisting of Ti, Zr, and Hf; C$_5$R$^1{}_{x-m}$H$_{5-x}$ and C$_5$R$^1{}_{y-m}$H$_{5-y}$ are equally or differently substituted cyclopentadienyl rings; the substituents R$^1$, the same or different from each other, are selected from the group conother, are selected from the group consisting of hydrogen, halogen, OH, SH, R$^1$, OR$^1$, SR$^1$, NR$^1{}_2$ and PR$^1{}_2$; m is 0 or 1; n is 0 or 1, being 1 when m=1; x ranges from (m+1) to 5; y ranges from m to 5;

(B) one or more organometallic aluminum compounds of formula (II);

$$AlR^4{}_{3-z}H_z \quad (II)$$

wherein the stibstituents R$^4$, the same or different from each other, are linear or branched, saturated or unsaturated C$_1$–C$_{20}$ alkyl or C$_7$–C$_{20}$ alkylaryl radicals, optionally containing Si or Ge atoms, at least one of the substituents $R^4$ being different from a straight alkyl group; z is 0 or 1; and (C) water;

the molar ratio between the organometallic aluminum compound and the water being comprised between 1:1 and 100:1;

the catalyst being obtained by a process comprising the following steps:

(i) contacting component (A) with part of component (B) in the absence of component (C);

(ii) contacting part of component (B) with component (C) in the absence of component (A); and (iii) contacting the products obtained in steps (i) and (ii);

wherein the components (B) used in steps (i) and (ii) can be the same or different from each other, with the proviso that component (C) is not adsorbed or absorbed on a silica support.

2. The catalyst according to claim 1, wherein component (B) is of formula (III):

$$\mathrm{Al(CH_2-CR^4R^5R^6)_wR^7_yH_z} \qquad (III)$$

wherein in the ($CH_2$—$CR^4R^5R^6$) groups, the same or different from each other, $R^4$ is a linear or branched, saturated or unsaturated $C_1$–$C_{10}$ alkyl or $C_7$–$C_{10}$ arylalkyl group; $R^5$ is a linear or branched, saturated or unsaturated $C_3$–$C_{50}$ alkyl, $C_6$–$C_{50}$ aryl, $C_7$–$C_{50}$ arylalkyl or alkylaryl group, which is different from a straight alkyl or alkenyl group; or $R^4$ and $R^5$ form a ring, having from 4 to 6 carbon atoms; $R^6$ is hydrogen or a linear or branched, saturated or unsaturated $C_1$–$C_{10}$ alkyl or $C_7$–$C_{10}$ arylalkyl group; the $R^7$ substituents, the same or different from each other, are linear or branched, saturated or unsaturated $C_1$–$C_{10}$ alkyl, $C_6$–$C_{10}$ aryl, $C_7$–$C_{10}$ arylalkyl or alkylaryl groups, optionally containing Si or Ge atoms; w is 1, 2, or 3; z is 0 or 1; and y=3−w−z.

3. The catalyst according to claim 1, wherein component (B) is tris(2,4,4-trimethyl-pentyl)aluminum.

4. The catalyst according to claim 1, wherein the component (B) is of formula (IV):

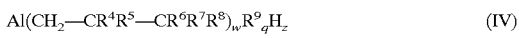

$$\mathrm{Al(CH_2-CR^4R^5-CR^6R^7R^8)_wR^9_qH_z} \qquad (IV)$$

wherein $R^4$ is a linear or branched, saturated or unsaturated $C_1$–$C_{10}$ alkyl or $C_7$–$C_{10}$ arylalkyl group; $R^5$ is hydrogen or a linear or branched, saturated or unsaturated $C_1$–$C_{10}$ alkyl or $C_7$–$C_{10}$ arylalkyl group; $R^6$ and $R^7$, the same or different from each other, are linear or branched or saturated or unsaturated $C^1$–$C_{10}$ alkyl, $C_6$–$C_{10}$ aryl, $C_7$–$C_{10}$ arylalkyl or alkylaryl groups; $R^8$ is hydrogen or a linear or branched, saturated or unsaturated $C_1$–$C_{10}$ alkyl $C_6$–$C_{10}$ aryl, $C_7$–$C_{10}$ arylalkyl or alkylaryl group; $R^9$ is a linear or branched, saturated or unsaturated $C_1$–$C_{10}$ alkyl or $C_7$–$C_{10}$ arylalkyl group; a carbon atom in the compound of formula (IV) being optionally replaced by a Si or Ge atom; w is 1,2 or 3; z is 0 or 1; and q=3−w−z.

5. The catalyst according to claim 4, wherein component (B) is tris(2,3,3-trimethyl-butyl)aluminum or tris(2,3-dimethyl-butyl)aluminum.

6. The catalyst according to claim 1, wherein component (B) is a mixture of two organometallic aluminum compounds of formula (II), wherein z=0 and z=1, so that the molar ratio between the hydrogen atoms directly bound to aluminum and aluminum atoms is lower than 0.8.

7. The catalyst according to claim 6, wherein the molar ratio between the hydrogen atoms directly bound to aluminum and aluminum ranges from 0.02 to 0.3.

8. The catalyst according to claim 1, wherein the molar ratio between the organometallic aluminum compound and the water is 2.

9. The catalyst according to claim 1, wherein the molar ratio between the aluminum of component (B) and the metal M of component (A) is from between 50 and 50,000.

10. The catalyst according to claim 1, wherein, in the cyclopentadienyl compound of formula (I), M is zirconium.

11. The catalyst according to claim 1, wherein, in the cyclopentadienyl compound of formula (I), m=0, and $C_5R^1_{x-m}H_{5-x}$ and $C_5R^1_{y-m}H_{5-y}$ are selected from the group consisting of tetramethyl-cyclopentadienyl, pentamethyl-cyclopentadienyl, indenyl and 4,5,6,7-tetrahydroindenyl.

12. The catalyst according to claim 1, wherein, in the cyclopentadienyl compound of formula (I), m is=1; $C_5R^1_{x-m}H_{5-x}$ and $C_5R^1_{y-m}H_{5-y}$ are selected from the group consisting of tetramethyl-cyclopentadienyl, indenyl, 2-methyl-indenyl, 4,7-dimethyl-indenyl, 2,4,7-trimethyl-indenyl, 4,5,6,7-tetrahydroindenyl, 2-methyl-4,5,6,7-tetrahydroindenyl, 4,7-dimethyl-4,5,6,7-tetrahydroindenyl, 2,4,7-trimethyl 4,5,6,7-tetrahydroindenyl, and fluorenyl groups; and $R^2$ is $(CH_3)_2Si<$ or —$CH_2CH_2$—.

13. The catalyst according to claim 1, wherein, in the cyclopintadienyl compound of formula (I), the substituents Q are selected from the group consisting of chlorine atoms or methyl groups.

14. A process for the homopolymerization or copolymerization of α-olefins, optionally in the presence of polyenes and/or cycloolefins, wherein the polymerization of the olefins takes place in the presence of a catalyst as described in claim 1.

15. The process according to claim 14, wherein the α-olefin is ethylene and component (B) is a mixture of two organometallic aluminum compounds of formula (II) wherein z=0 and z=1, in such amounts that the molar ratio between the hydrogen atoms directly bound to aluminum and aluminum atoms ranges from 0.02 to 0.3.

16. The process according to claim 15, wherein the molar ratio between the hydrogen atoms directly bound to aluminum and aluminum atoms is higher than 0.02 in step (i), and is lower than 0.2 in step (ii).

17. The process according to claim 14, wherein the α-olefin is propylene and component (B) is a mixture of two organometallic aluminum compounds of formula (II) wherein z=0 and z=1, in such amounts that the molar ratio between the hydrogen atoms directly bound to aluminum and aluminum atoms ranges from 0.02 to 0.3.

18. The process according to claim 17 wherein the molar ratio between the hydrogen atoms directly bound to aluminum and aluminum atoms is higher than 0.02 in step (i), and is lower than 0.4 in step (ii).

19. A process for preparing a catalyst for the polymerization of olefins as described in claim 1, comprising the following steps:

(i) contacting component (A) with part of component (B) in the absence of component (C), wherein components (A), (B) and (C) have the meaning reported in claim 1;

(ii) contacting part of component (B) with component (C) in the absence of component (A); and (iii) contacting the products obtained in steps (i) and (ii); wherein components (B) used in steps (i) and (ii) can be the same or different from each other.

* * * * *

UNITED STATES PATENT AND TRADEMARK OFFICE
CERTIFICATE OF CORRECTION

PATENT NO. : 6,476,163 B2
DATED : November 5, 2002
INVENTOR(S) : Van Baar et al.

It is certified that error appears in the above-identified patent and that said Letters Patent is hereby corrected as shown below:

Column 14,
Line 2, change "$C_7$-$C_2$" to -- $C_7$-$C_{20}$ --.

Column 15,
Line 51, change "$C^1$-$C_{10}$" to -- $C_1$-$C_{10}$ --.

Column 16,
Line 24, change "2,4,7-trimethyl 4,5,6,7-tetrahydroindenyl" to -- 2,4,7-trimethyl-4,5,6,7-tetrahydroindenyl --.
Line 27, change "cyclopintadienyl" to -- cyclopentadienyl --.

Signed and Sealed this

First Day of April, 2003

JAMES E. ROGAN
*Director of the United States Patent and Trademark Office*